United States Patent
Sweeney et al.

[19]

[11] Patent Number: 5,854,464
[45] Date of Patent: Dec. 29, 1998

[54] MARINE CARBURETOR ANTI-ICING APPARATUS

[75] Inventors: Mark E. Sweeney, Oshkosh; Paul H. Jennerjahn, Greenville, both of Wis.

[73] Assignee: Brunswick Corporation, Lake Forest, Ill.

[21] Appl. No.: 851,908

[22] Filed: May 6, 1997

Related U.S. Application Data

[63] Continuation of Ser. No. 302,500, Sep. 8, 1994, Pat. No. 5,628,927.

[51] Int. Cl.$^6$ .............................. F02M 15/04; H05B 3/00
[52] U.S. Cl. .......................... 219/207; 123/549; 261/138; 261/142; 261/DIG. 20
[58] Field of Search ................................... 219/205–208; 123/543, 545, 547, 549, 557; 261/142, 138, DIG. 20

[56] References Cited

U.S. PATENT DOCUMENTS

| | | | |
|---|---|---|---|
| 1,091,488 | 3/1914 | Dodge | 219/207 |
| 1,109,735 | 9/1914 | Bignell | 219/207 |
| 1,236,440 | 8/1917 | Humitsch | 219/207 |
| 1,321,462 | 11/1919 | Line | 219/207 |
| 1,498,684 | 6/1924 | Day | 219/207 |
| 2,287,593 | 6/1942 | Ball . | |
| 2,603,199 | 7/1952 | Moseley . | |
| 2,655,141 | 10/1953 | Hayden . | |
| 2,715,520 | 8/1955 | Boyce . | |
| 2,766,974 | 10/1956 | McConnell . | |
| 3,246,841 | 4/1966 | Kling | 237/12.3 |
| 3,672,342 | 6/1972 | Ojala . | |
| 3,872,849 | 3/1975 | Chester et al. . | |
| 3,916,859 | 11/1975 | Fossum . | |
| 4,108,953 | 8/1978 | Rocco | 261/142 |
| 4,356,804 | 11/1982 | Igashira et al. | 123/549 |
| 4,376,739 | 3/1983 | Passey, Jr. | 261/142 |
| 4,389,354 | 6/1983 | Endou et al. | 261/142 |
| 4,465,053 | 8/1984 | Berg | 123/549 |
| 4,467,773 | 8/1984 | Chiavaroli | 219/207 |
| 4,500,772 | 2/1985 | Ahner et al. | 219/209 |
| 4,717,808 | 1/1988 | Cyll et al. | 219/207 |
| 4,816,192 | 3/1989 | Abou-Aly et al. | 261/DIG. 20 |
| 4,818,842 | 4/1989 | Walty | 219/205 |
| 5,186,133 | 2/1993 | Watanabe et al. | 123/179.14 |
| 5,628,927 | 5/1997 | Sweeney et al. | 219/207 |

FOREIGN PATENT DOCUMENTS

| | | | |
|---|---|---|---|
| 196961 | 11/1984 | Japan | 261/DIG. 20 |
| 59-192855 | 11/1984 | Japan . | |
| 61-145349 | 7/1986 | Japan . | |
| 62-298652 | 12/1987 | Japan . | |
| 1-195962 | 8/1989 | Japan . | |
| 4-91356 | 3/1992 | Japan . | |
| 5-322129 | 12/1993 | Japan . | |

*Primary Examiner*—John A. Jeffery
*Attorney, Agent, or Firm*—Andrus, Sceales, Starke & Sawall

[57] ABSTRACT

A carburetor anti-icing apparatus and method for a marine drive is provided for heating a carburetor to a temperature above that at which ice may form in the idle and progression circuits of the carburetor. Several heaters, heat sources, and methods are disclosed for heating the carburetor. In one embodiment an electrical heating element is mounted to the carburetor body near the fuel orifices which make up the idle and progression circuits. In another embodiment, engine cooling water is circulated through a heater housing mounted to the carburetor body. In yet a further embodiment, engine exhaust from the marine drive is conveyed through the heater housing mounted to the carburetor body. A thermally conductive gasket is used to improve heat transfer. The carburetor anti-icing apparatus and method also improves low speed running performance due to the improved fuel vaporization resulting from the increased temperature in the progression circuit.

2 Claims, 3 Drawing Sheets

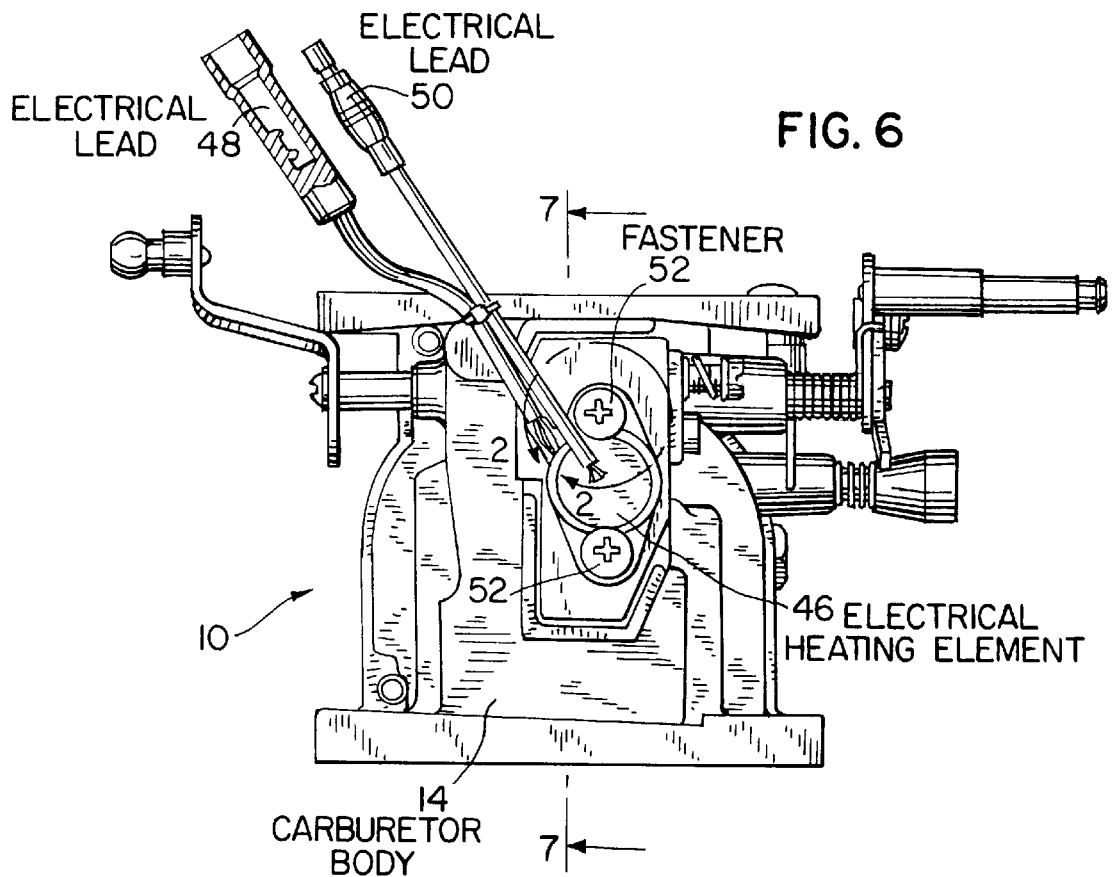
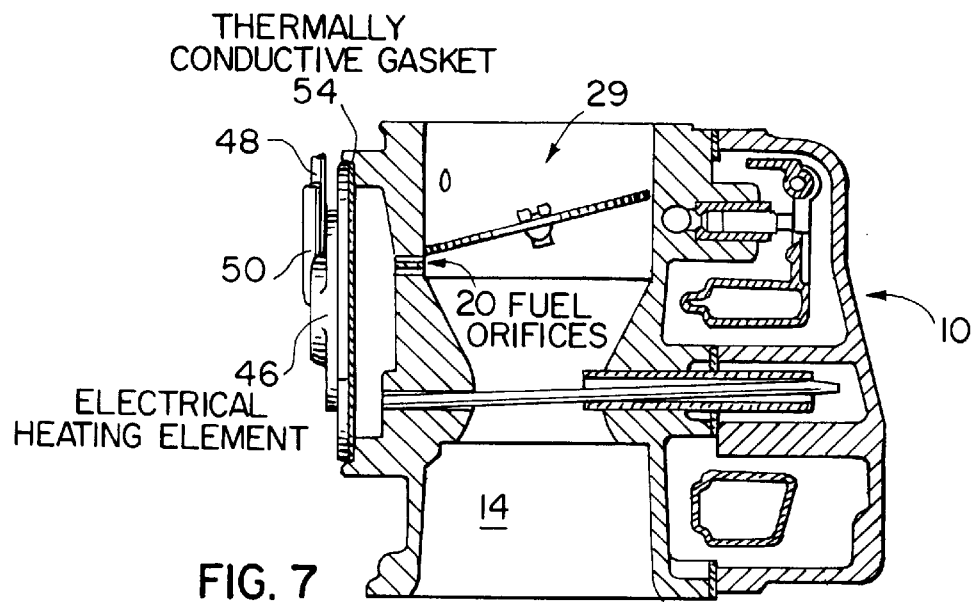

5,854,464

MARINE CARBURETOR ANTI-ICING APPARATUS

This is a continuation of application Ser. No. 08/302,500 filed on Sep. 8, 1994, now U.S. Pat. No. 5,628,927 issued on May 13, 1997.

BACKGROUND OF THE INVENTION

The invention relates to marine drives, and more particularly to an apparatus and method for preventing ice build-up in the carburetor of a marine drive.

Carburetor icing is a problem that may occur when a marine drive is operated in cooler ambient temperatures combined with high moisture content in the air which may be the result of high humidity or the splash and mist of operating the marine drive in water. When the carburetor mixes fuel and air under such conditions, ice may form over, or in, the small holes which make up the idle and off-idle circuits of the carburetor. Carburetor icing can occur in ambient temperatures above the freezing point of water due to the cooling effects of the carburetor venturi and the evaporative cooling effect of the fuel in the carburetor. The formation of ice particles in and around the carburetor circuit holes results in a malfunction of the air/fuel delivery circuit of the carburetor, thereby causing poor performance, and in severe cases, stalling of the engine.

The addition of a water disbursing additive to the fuel is ineffective in preventing carburetor icing in marine drives because the source of the water is in the air that the marine drive operates—not the fuel. Since a marine drive inherently operates under high moisture conditions, operating in cooler ambient temperatures, or when an unexpected drop in temperature occurs, could strand an operator in the middle of a body of water. Further, once carburetor icing occurs, the operator has very limited options available because the presence of a flammable fuel in the carburetor limits the application of heat sources to thaw the carburetor icing. Therefore, a method and apparatus to prevent carburetor icing is highly desirable in marine drives.

SUMMARY OF THE INVENTION

The present invention provides a solution to carburetor icing by providing an anti-icing apparatus and method suitable for a marine drive. The invention involves heating the carburetor body in the area of the idle and off-idle (progression) circuits to a temperature above that at which ice will form. This prevents the formation of ice in and over the holes which form the idle and progression circuits. A further benefit of heating the carburetor results in improved fuel vaporization which in turn improves the low speed performance of the marine drive.

Several embodiments are disclosed to accomplish the carburetor anti-icing of the present invention. In one embodiment, a means for heating the carburetor to a temperature above that at which ice forms comprises an electronic heating element mounted to the carburetor body using a thermally conductive gasket such that the heat produced by the electronic heating element is transferred to the carburetor body to prevent the formation of ice in, or over the holes which form the idle and progression circuits. The electronic heating element may be a positive temperature coefficient (PTC) thermistor or a resistive heating element.

Another embodiment comprises a means for heating the carburetor comprising a heater housing having an inlet and an outlet connected to the engine cooling system such that warm water is routed from a liquid cooled marine drive engine to the heater housing thereby warming the heater housing and the carburetor.

Yet a further embodiment comprises a means for heating the carburetor comprising a heater housing having an inlet and an outlet to convey engine exhaust from the marine drive engine to the inlet and through the heater housing. The outlet of the heater housing is connected to the exhaust system of the marine drive. In this manner, heat from the exhaust is transferred to the heater housing, through the thermally conductive gasket, and to the carburetor body thereby preventing the formation of ice in or near the idle and/or progression circuits of the carburetor.

Alternatively, any of the prior mentioned embodiments may be incorporated directly into the carburetor body during manufacture of the carburetor.

Additional benefits and advantages of the present invention will become apparent from the subsequent detailed description of the preferred embodiment, the drawings, and the claims.

BRIEF DESCRIPTION OF THE DRAWINGS

FIG. 6 shows a marine drive carburetor in accordance with a further embodiment of the present invention.

FIG. 7 is a sectional view taken along line 7—7 of FIG. 6.

DETAILED DESCRIPTION OF THE PREFERRED EMBODIMENT

Figure 1:
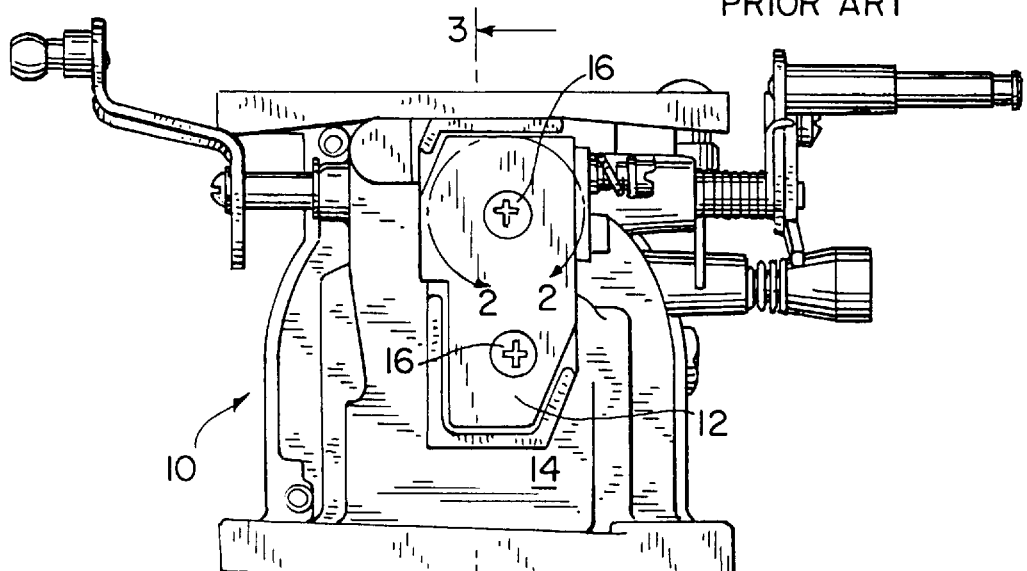
FIG. 1 shows a typical marine drive carburetor.

FIG. 1 shows carburetor 10 for a marine drive having a progression circuit cover 12 mounted to the carburetor body 14 by fastening screws 16.

Figure 2:
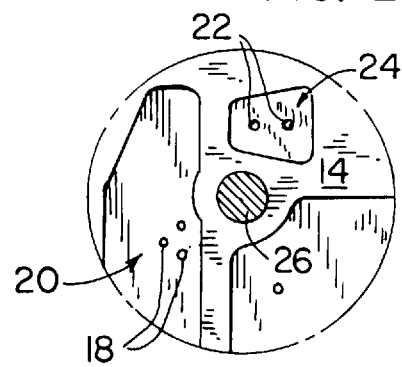
FIG. 2 is a detailed sectional view taken along line 2—2 of FIGS. 1, 4, and 6.

FIG. 2 is a detailed view of carburetor 10 having progression circuit cover 12 removed. Fuel orifices 18 comprise a progression circuit 20 for the transfer of fuel in off-idle conditions. Fuel orifices 22 comprise idle circuit 24 for transferring fuel under idle conditions. Hole 26 receives fastener 16, FIG. 1.

Figure 3:
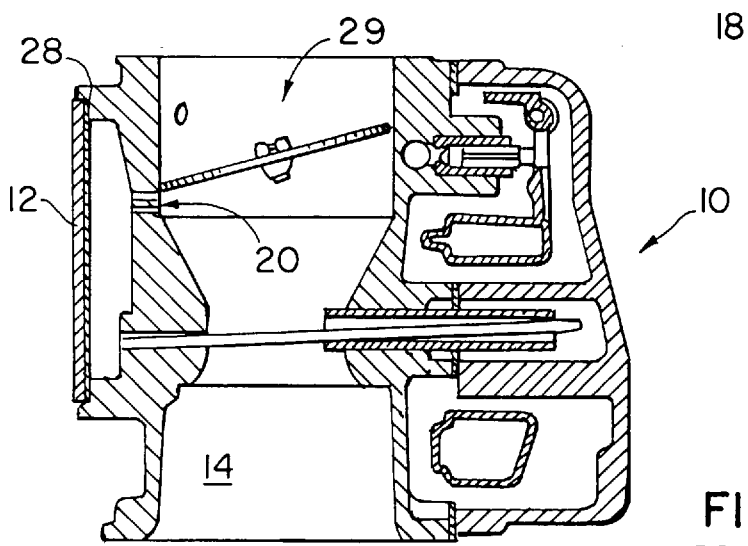
FIG. 3 is a sectional view taken along line 3—3 of FIG. 1.

FIG. 3 is a sectional view taken along line 3—3 of FIG. 1 and shows progression circuit cover 12, gasket 28 and progression circuit 20 leading to throat 29.

Figure 4:
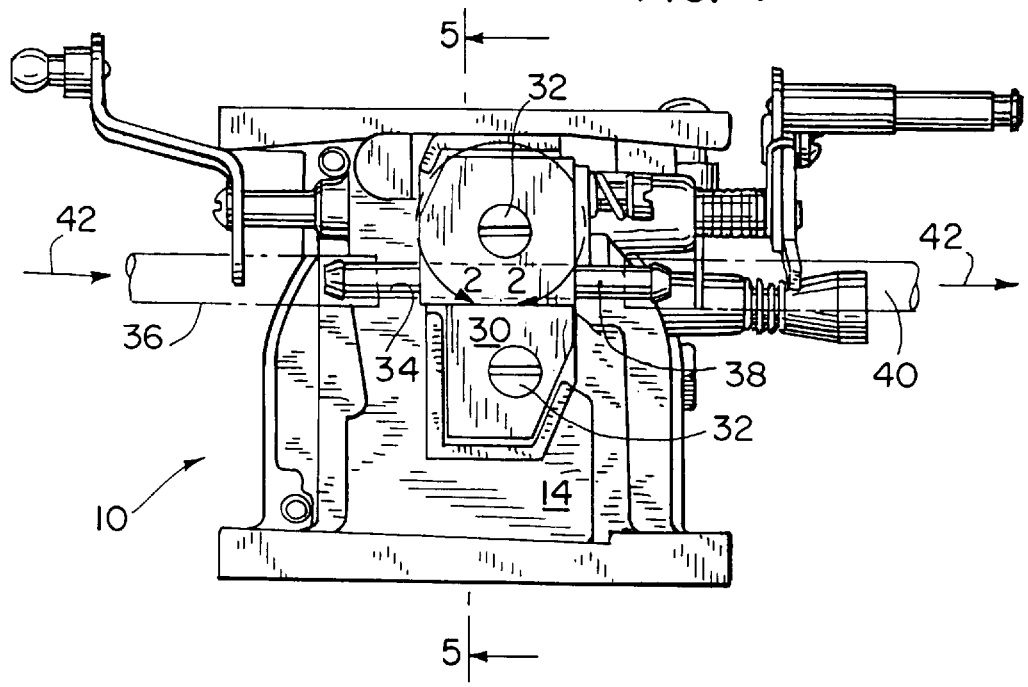
FIG. 4 shows a marine drive carburetor in accordance with the present invention.
Figure 5:
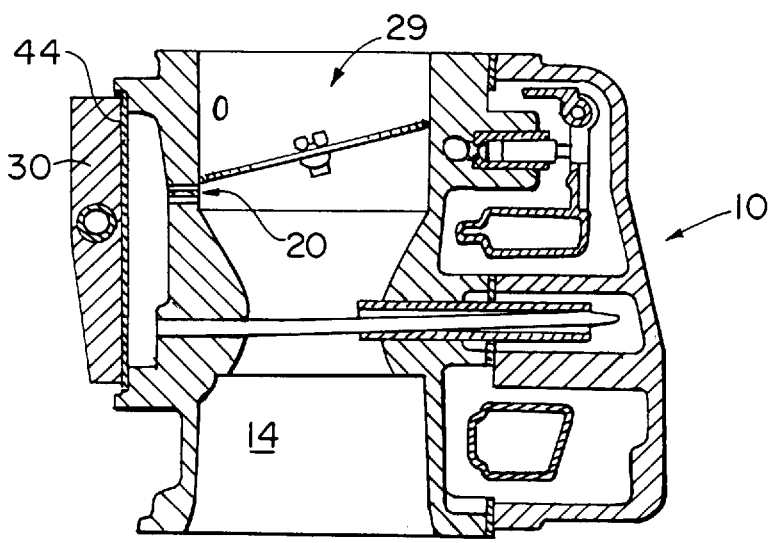
FIG. 5 is a sectional view taken along line 5—5 of FIG. 4.

FIG. 4 shows a means for heating carburetor 10 comprising a heater housing 30 mounted to carburetor body 14 by fasteners 32. Heater housing 30 has inlet 34 for receiving supply line 36, and outlet 38 for receiving return line 40. As indicated by arrows 42, a heating medium is conveyed through supply line 36, into inlet 34, through heater housing 30, out outlet 38, and through return line 40 such that at least a portion of the heat in the heating medium is transferred to heater housing 30 which is mounted to carburetor body 14 such that the heat transferred to heater housing 30 is further transferred to carburetor body 14 to heat the area of fuel orifices 18 and 22, FIG. 2. A thermally conductive gasket 44, FIG. 5, is placed between heater housing 30 and carburetor body 14 for improved heat transfer. The heating medium used to pass through heater housing 30, FIG. 4, at 42 maybe either engine cooling liquid or engine exhaust from the marine drive. In either case, although the heater housing 30 is shown as an add-on item to carburetor 10, it maybe manufactured integrally with carburetor body 14.

FIG. 6 shows a means for heating carburetor 10 comprising an electrical heating element 46 having a battery voltage lead 48 to be connected to a battery voltage, and a battery ground lead 50 to be connected to a battery ground. Preferably, electrical heating element 46 is a positive temperature coefficient (PTC) thermistor which has the added benefit of varying the heat produced according to the ambient temperature. In other words, a PTC thermistor will automatically increase energy consumption and therefore produce increased heat, as the ambient temperature decreases. Conversely, after the temperature of carburetor body 14 increases, the PTC thermistor 46 will reduce energy consumption and produce less heat. Alternatively, electrical heating element 46 may comprise a typical resistive heating element. Electrical heating element 46 is mounted to carburetor body 14 with fasteners 52. Thermally conductive gasket 54, FIG. 7, is situated between electrical heating element 46 and carburetor body 14 to improve heat transfer in the area of fuel orifices 18 and 22, FIG. 2.

Generally, electrical heating element 46, FIG. 6, and heater housing 30, FIG. 4, whether implemented with engine exhaust or engine cooling liquid, are carburetor heaters. The present invention further includes a method of retrofitting a marine drive carburetor by replacing progression circuit cover 12, FIG. 1, and gasket 28, FIG. 3, with a carburetor heater 30, FIG. 4, or 46, FIG. 6, and a thermally conductive gasket 44, FIG. 5, or 54, FIG. 7, and connecting a source of heat, whether electrical, engine exhaust, or engine cooling liquid.

If heater housing 30 is connected to engine cooling liquid, supply line 36 is connected between inlet 34 and the liquid cooled engine. Return or discharge line 40 is connected between outlet 38 and either the liquid cooled engine in closed cooling systems, or simply discharged in open cooling systems. If heater housing 30 is connected to engine exhaust, supply line 36 is connected from the marine engine to inlet 34, and return line 40 is connected between outlet 38 and the exhaust system of the marine drive.

It is recognized that various equivalents, alternatives, and modifications are possible within the scope of the appended claims.

We claim:

1. In a marine drive carburetor having a carburetor body containing a set of small fuel orifices for an idle circuit and a progression circuit, a progression circuit cover that is removably mounted on a side of the carburetor over the idle and progression circuits by at least one fastener at a fastening location on the carburetor body near the fuel orifices forming the idle and progression circuits, and a sealing gasket located adjacent the fuel orifices between the progression circuit cover and the carburetor body, an improved carburetor anti-icing apparatus for heating the carburetor body adjacent the idle and progression circuits to prevent the formation of ice in and over the set of small fuel orifices forming the idle and progression circuits, said carburetor anti-icing apparatus comprising:

a carburetor heater and a thermally conductive gasket which are removably mounted to the carburetor body on the side of the carburetor over the set of small fuel orifices forming the idle and progression circuits in place of the recited progression circuit cover and sealing gasket;

wherein the carburetor heater includes two electrical leads and an electrical heating element and is removably mounted to the carburetor body by at least one fastener at the fastening location on the carburetor body near the fuel orifices; and wherein the thermally conductive gasket includes no more than one layer mounted between the carburetor heater and the carburetor body and surrounds the set of small fuel orifices in the carburetor body forming the idle and progression circuits, thereby facilitating heat transfer from the electrical heating element in the carburetor heater to the carburetor body in the vicinity of the set of small fuel orifices forming the idle and progression circuits to prevent the formation of ice in and over the set of small fuel orifices and provide improved low speed operation.

2. The carburetor anti-icing apparatus recited in claim 1 wherein the electrical heating element is a PTC thermistor.

\* \* \* \* \*